(12) United States Patent
Suga

(10) Patent No.: US 10,148,633 B2
(45) Date of Patent: Dec. 4, 2018

(54) INFORMATION PROCESSING APPARATUS, AND METHOD AND PROGRAM FOR CONTROLLING INFORMATION PROCESSING APPARATUS

(71) Applicant: CANON KABUSHIKI KAISHA, Tokyo (JP)

(72) Inventor: Daisuke Suga, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 15/065,540

(22) Filed: Mar. 9, 2016

(65) Prior Publication Data

US 2016/0269384 A1   Sep. 15, 2016

(30) Foreign Application Priority Data

Mar. 13, 2015 (JP) ................. 2015-050969

(51) Int. Cl.
| | |
|---|---|
| H04L 29/06 | (2006.01) |
| H04N 1/44 | (2006.01) |
| H04W 12/06 | (2009.01) |
| H04W 4/80 | (2018.01) |

(52) U.S. Cl.
CPC ............ H04L 63/08 (2013.01); H04L 63/107 (2013.01); H04N 1/4413 (2013.01); H04W 4/80 (2018.02); H04W 12/06 (2013.01); *H04N 2201/006* (2013.01); *H04N 2201/0039* (2013.01); *H04N 2201/0055* (2013.01); *H04N 2201/0094* (2013.01)

(58) Field of Classification Search
CPC ..... H04L 63/08; H04L 63/107; H04N 1/4413; H04N 2201/39; H04N 2201/55; H04N 2201/006; H04N 2201/0094; H04W 4/008; H04W 12/06; H04W 4/80
See application file for complete search history.

(56) References Cited

U.S. PATENT DOCUMENTS

| | | | |
|---|---|---|---|
| 8,793,776 B1 * | 7/2014 | Jackson ................ | H04W 4/023 726/7 |
| 9,032,498 B1 * | 5/2015 | Ben Ayed ............... | G06F 21/35 726/9 |
| 9,348,981 B1 * | 5/2016 | Hearn ................... | H04L 9/3271 |
| 9,723,004 B2 * | 8/2017 | Yang ...................... | H04L 63/10 |
| 2006/0195495 A1 * | 8/2006 | Asano .................. | G06F 3/1454 708/111 |
| 2009/0103124 A1 * | 4/2009 | Kimura ................ | G06F 3/1204 358/1.15 |

(Continued)

FOREIGN PATENT DOCUMENTS

| | | | | |
|---|---|---|---|---|
| JP | 2011-227760 A | 11/2011 | | |
| WO | WO 2015097431 A1 * | 7/2015 | ............ | G06F 21/34 |

*Primary Examiner* — Sarah Su
(74) *Attorney, Agent, or Firm* — Canon USA Inc., IP Division

(57) ABSTRACT

An information processing apparatus individually sets a login distance as a condition to be satisfied when a login request is transmitted for a plurality of devices. Further, the information processing apparatus determines whether a login distance condition, having been set, is satisfied based on receipt of a packet. The information processing apparatus transmits the login request to the transmission source device if it is determined that the login distance condition is satisfied.

20 Claims, 13 Drawing Sheets

(56) References Cited

U.S. PATENT DOCUMENTS

| | | | | |
|---|---|---|---|---|
| 2012/0151210 A1* | 6/2012 | Perez | ............... | G06F 21/35 713/168 |
| 2013/0039213 A1* | 2/2013 | Averbuch | ............... | H04L 67/34 370/254 |
| 2013/0070297 A1* | 3/2013 | Kato | ............... | H04N 1/00217 358/1.15 |
| 2013/0086638 A1* | 4/2013 | Itogawa | ............... | G06F 21/34 726/4 |
| 2013/0139249 A1* | 5/2013 | Uchikawa | ............... | G06F 21/31 726/19 |
| 2013/0242343 A1* | 9/2013 | Ikeuchi | ............... | H04N 1/00079 358/1.15 |
| 2013/0276070 A1* | 10/2013 | Lee | ............... | G06F 21/31 726/4 |
| 2014/0115042 A1* | 4/2014 | Yin | ............... | H04L 65/403 709/203 |
| 2014/0157381 A1* | 6/2014 | Disraeli | ............... | G06F 21/31 726/7 |
| 2014/0168702 A1* | 6/2014 | Morita | ............... | H04N 1/00278 358/1.15 |
| 2015/0067803 A1* | 3/2015 | Alduaiji | ............... | G06F 21/31 726/7 |
| 2015/0070134 A1* | 3/2015 | Nagisetty | ............... | G07C 9/00111 340/5.61 |
| 2015/0128256 A1* | 5/2015 | Nakao | ............... | G06F 21/35 726/19 |
| 2015/0229788 A1* | 8/2015 | Shimizu | ............... | H04N 1/00244 358/1.13 |
| 2015/0256973 A1* | 9/2015 | Raounak | ............... | H04W 4/029 726/7 |
| 2016/0274753 A1* | 9/2016 | Nagata | ............... | G07F 17/266 |
| 2016/0328550 A1* | 11/2016 | Pritchard | ............... | G06F 21/34 |
| 2017/0264758 A1* | 9/2017 | Naito | ............... | H04W 36/14 |
| 2017/0310849 A1* | 10/2017 | Hosoda | ............... | H04N 1/32791 |

* cited by examiner

FIG.9

AUTOMATIC LOGIN SETTING INFORMATION (Bluetooth R)

| UUID | MODEL NAME | INDIVIDUAL IDENTIFIER | LOGIN CLASS | AUTOMATIC LOGIN | AUTOMATIC LOGIN DISTANCE |
|---|---|---|---|---|---|
| aaaa aaaa-aaaa-aaaa-aaaa aaaa | MFP A | aaaaaaaa | LOCAL | YES | Immediate |
| bbbb bbbb-bbbb-bbbb-bbbb bbbb | MFP B | bbbbbbbb | LOCAL | YES | Immediate |
| cccc cccc-cccc-cccc-cccc cccc | MFP C | cccccccc | LOCAL | NO | — |

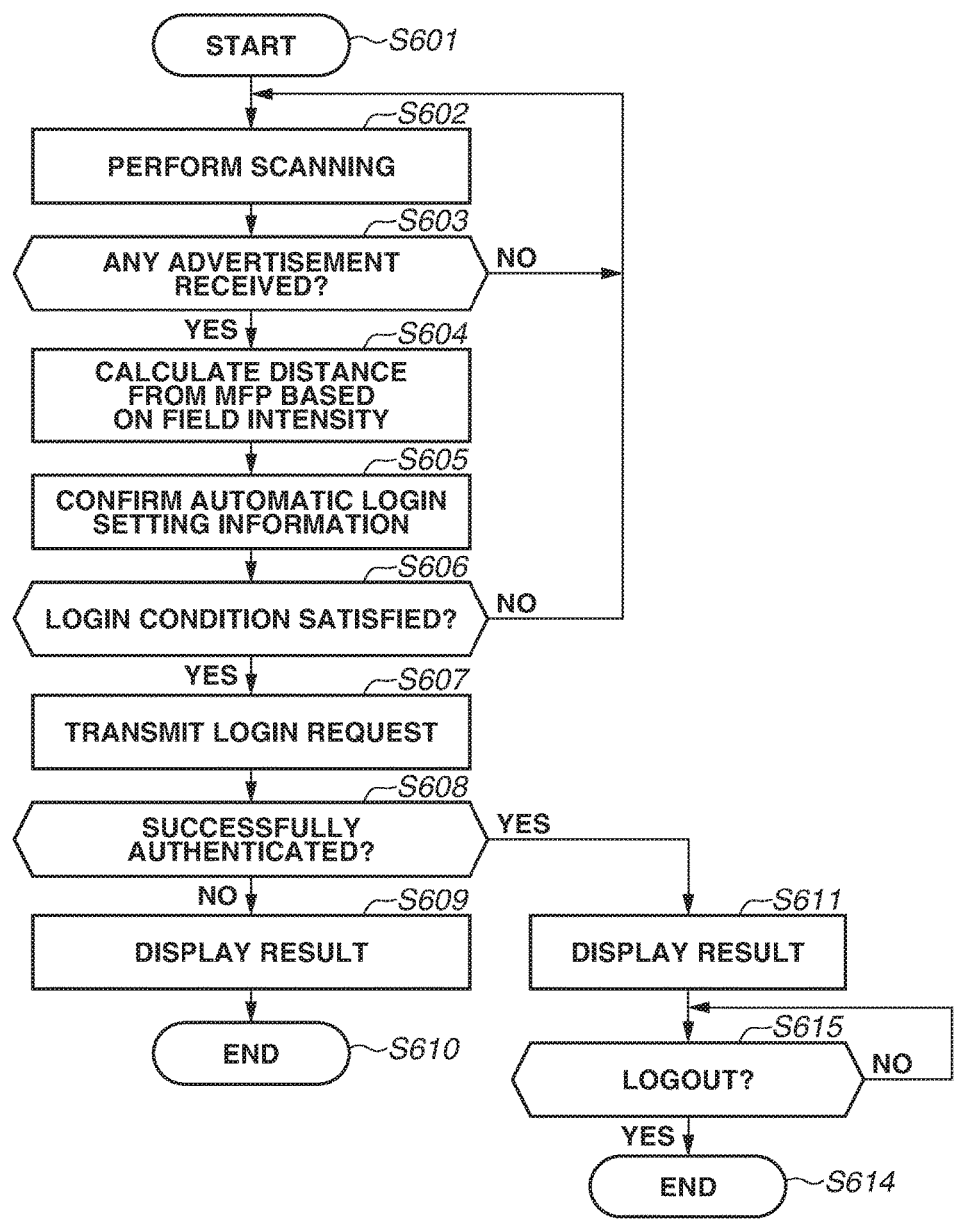

INFORMATION PROCESSING APPARATUS, AND METHOD AND PROGRAM FOR CONTROLLING INFORMATION PROCESSING APPARATUS

BACKGROUND OF THE INVENTION

Field of the Invention

The present invention relates to an information processing apparatus, a method for controlling the information processing apparatus, and a related program.

Description of the Related Art

As discussed in Japanese Patent Application Laid-Open No. 2011-227760, a user of a device is conventionally required to perform a login operation by causing a card reader connected to the device to read a predetermined card. When an IC card is used to perform a login operation required for a device, as discussed in Japanese Patent Application Laid-Open No. 2011-227760, a user usually approaches the device and performs an operation for causing an equipped IC card reader to read the IC card. In this case, the user is required to wait for a while until authentication processing completes. More specifically, it is necessary for the user to perform a troublesome work, such as inserting or locating the IC card into or closely to the IC card reader, for the login processing.

SUMMARY OF THE INVENTION

According to an aspect of the present invention, an information processing apparatus can transmit a login request to a device. The information processing apparatus includes a setting unit configured to individually set a login distance as a condition to be satisfied when the login request is transmitted for a plurality of devices. The information processing apparatus further includes a reception unit configured to receive a packet transmitted from the device, a determination unit configured to determine whether a login distance condition having been set for the transmission source device that has transmitted the packet is satisfied based on the packet received by the reception unit, and a transmission unit configured to transmit the login request to the transmission source device if the determination unit determines that the login distance condition is satisfied.

Further features of the present invention will become apparent from the following description of exemplary embodiments with reference to the attached drawings.

BRIEF DESCRIPTION OF THE DRAWINGS

FIG. 9 illustrates an example of automatic login setting information.

FIG. 13 is a flowchart illustrating information processing that can be performed by the portable terminal.

DESCRIPTION OF THE EMBODIMENTS

Exemplary embodiments of the present invention will be described in detail below with reference to attached drawings.

<System Configuration>

Figure 1:
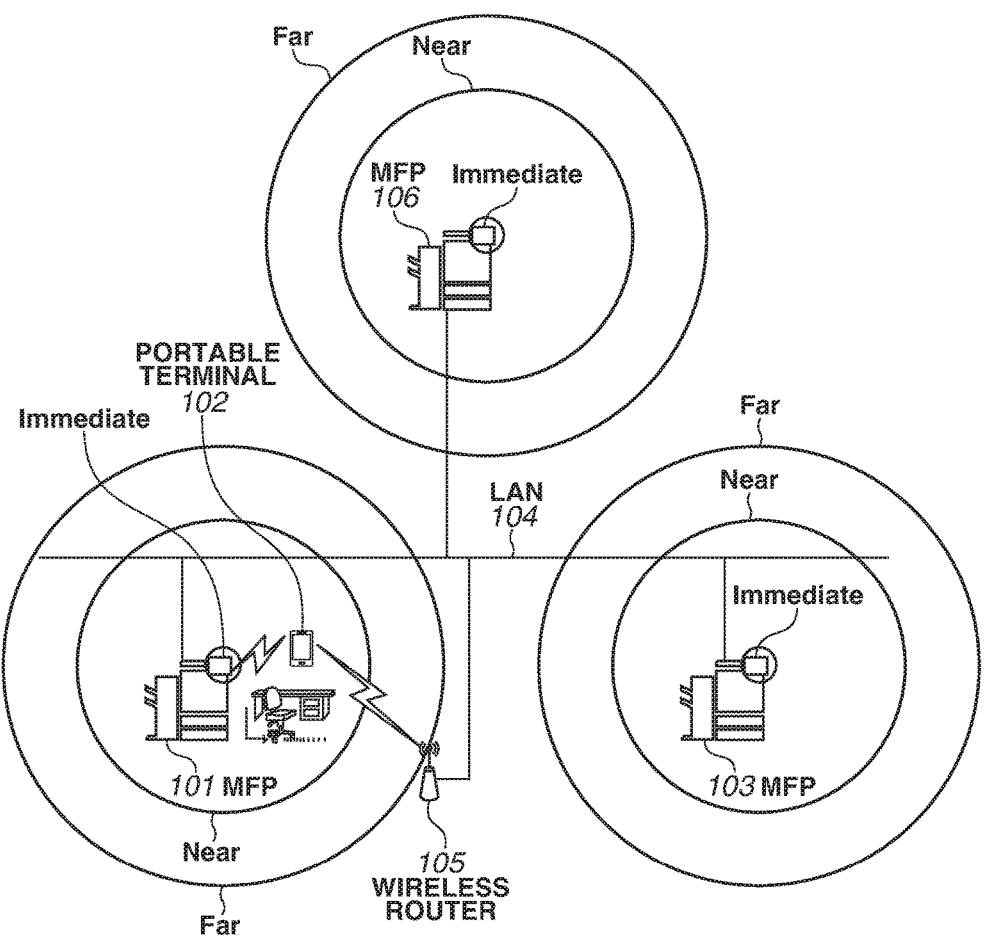
FIG. 1 illustrates an example of a system configuration of a communication system.

Hereinafter, a first exemplary embodiment will be described in detail below. FIG. 1 illustrates an example of a system configuration of a communication system. The communication system according to the present exemplary embodiment includes a plurality of image forming apparatuses and a plurality of portable terminals. In the following description, each image forming apparatus may be referred to as a multi function peripheral (MFP). For example, in this office environment, each user owns and carries a personal portable terminal, which constitutes a part of the communication system. Each MFP is an example of an image forming apparatus provided in the office. FIG. 1 illustrates an MFP 101, an MFP 103, an MFP 106, and a portable terminal 102, which are individual apparatuses constituting the communication system. The portable terminal 102 and other portable terminals are owned by different users. Each of the MFP 101, the MFP 103, and the MFP 106 is connected to a local area network (LAN) 104 and can communicate with other terminal accessible via the LAN 104. Similarly, each of the portable terminal 102 and other portable terminals has a wireless LAN function and is connectable to the LAN 104 via a wireless router 105. In other words, the terminals connectable to the LAN 104 can communicate with each other.

Further, each of the MFP 101, the MFP 103, the MFP 106, the portable terminal 102, and other portable terminals has a Bluetooth (registered trademark) communication function and can communicate with each other within a Bluetooth communication area. FIG. 1 illustrates "Far", "Near", and "Immediate" as conceptual zones that can be calculated based on electric power received by a receiver side when an advertizing packet of Bluetooth Low Energy, which includes electric power, is transmitted from a transmitter side. More specifically, "Immediate" defines a short-range zone within the distance of approximately 2 cm, which is nearly a state of non-contact. "Near" defines a medium-range zone within the distance of approximately 2 m. "Far" defines a long-range zone within the distance of approximately 10 m.

The portable terminal is an example of the information processing apparatus or a computer. The MFP is an example of a device.

<Hardware Configuration>

Figure 2:
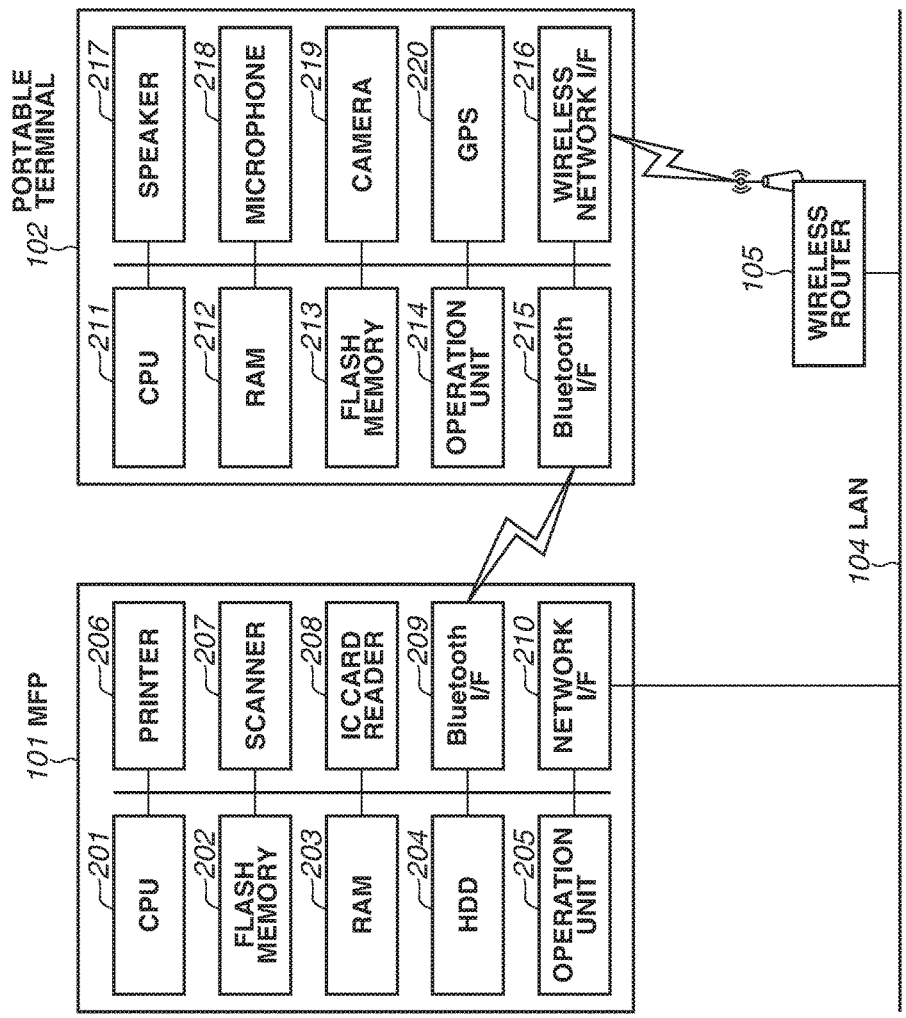
FIG. 2 illustrates an example of a hardware configuration of each apparatus that constitutes the communication system.

Next, a hardware configuration according to the present exemplary embodiment will be described with reference to FIG. 2.

<Hardware Configuration of MFP 101>

A central processing unit (CPU) 201 can control various operations to be performed by the MFP 101. The CPU 201 reads control programs from a flash memory 202 or a hard disk drive (HDD) 204 and performs various controls including reading, recording, and transmission/reception controls. A random access memory (RAM) 203 is a volatile memory that can be used as a work area when the CPU 201 runs various programs. The HDD 204 stores image data, various programs, and setting values. The flash memory 202 stores various programs and setting values. An operation unit 205 includes a display device, which can function as a touch panel that a user can operate manually. A printer 206 can print image data, which has been received via an internal bus, on a paper. A scanner 207 can read an image of an original document and can generate image data of the document. A Bluetooth I/F 209 is an interface that can perform wireless communications according to Bluetooth standards and can communicate with an external device having a Bluetooth I/F. In the present exemplary embodiment, the Bluetooth I/F 209 can perform Bluetooth communication with the portable terminal 102. A network I/F 210 can perform control to transmit and receive data to and from another device connected to the LAN 104. An IC card reader 208 can read information from an IC card that can be used for user authentication. The above-mentioned hardware components 201 to 210 are mutually connected via the internal bus to transmit and receive data. Further, to shift the operation mode into a sleep mode (i.e., a power saving mode), the CPU 201 can turn off the power source of each module that is not used in the power saving state. Further, the CPU 201 can shift a module, if it is not used in the power saving mode, into the power saving state. Each of the MFP 103 and the MFP 106 has a hardware configuration similar to that of the MFP 101.

When the CPU 201 reads programs from the flash memory 202 and/or the HDD 204 and performs processing according to the read programs, the CPU 201 can realize a software configuration of the MFP 101 and can perform processing according to the flowchart described below.

<Hardware Configuration of Portable Terminal 102>

A central processing unit (CPU) 211 can control various operations to be performed by the portable terminal 102. A random access memory (RAM) 212 is a volatile memory that can be used as a work area when the CPU 211 executes various programs. A flash memory 213 is a nonvolatile memory that can store various programs, data, and setting values. An operation unit 214 includes a display device, which can function as a touch panel that a user can operate manually. A Bluetooth I/F 215, which is an interface equipped in the portable terminal 102, can perform Bluetooth communications. The portable terminal 102 can communicate with another device having a Bluetooth interface via the Bluetooth I/F 215. In the present exemplary embodiment, the Bluetooth I/F 215 can communicate with the MFP 101. A wireless network I/F 216, which is another interface equipped in the portable terminal 102, is connectable with the wireless router 105 to perform a control to transmit and receive data to and from another device. A speaker 217, which is an example of audio equipments, can convert electronic signals into sounds. A microphone 218, which is another example of the audio equipments, can convert detected sounds into electronic signals. A camera 219 can convert captured still images and moving images into electronic data. A GPS 220 is a receiver that belongs to a Global Positioning System.

When the CPU 211 reads a program from the flash memory 213 and executes processing according to the read program, the CPU 211 can realize a software configuration of the portable terminal 102 and can perform processing according to flowcharts described below.

<Software Configuration According to Present Exemplary Embodiment>

A software configuration according to the present exemplary embodiment will be described in detail below with reference to FIG. 3.

<Software Configuration of MFP 101>

Figure 3:
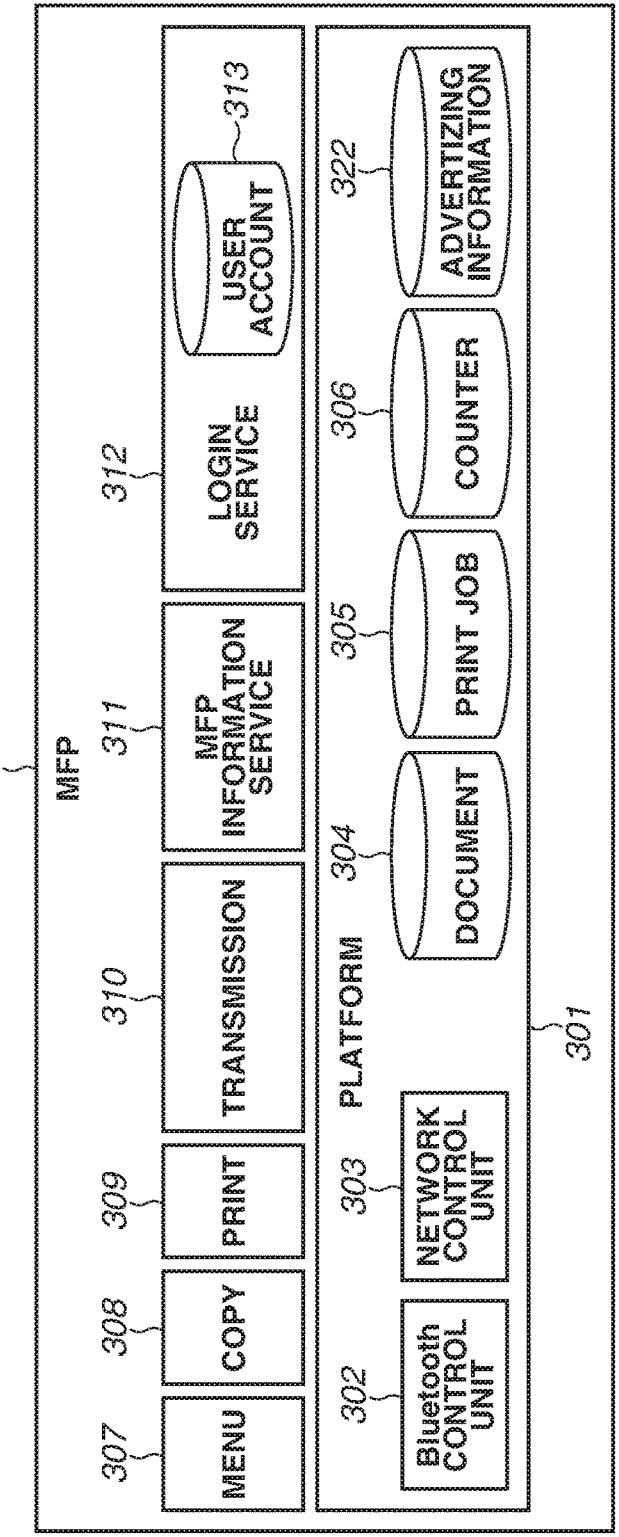
FIG. 3 illustrates an example of a software configuration of a multi-function peripheral (MFP).

FIG. 3 illustrates an example of the software configuration of the MFP 101 and an example of data regions managed by the software. The MFP 101 includes a plurality of data regions for various data, such as advertizing information 322, document 304, print job 305, counter 306, and user account 313, which are recorded in the RAM 203, the HDD 204, or the flash memory 202 and can be managed by the software. The MFP 101 includes a platform 301, which is constituted in such a way as to include an operating system, e.g., Linux (registered trademark), a JAVA (registered trademark) virtual machine, an OSGi (registered trademark) framework, and a device driver group. The OSGi framework is a JAVA based service platform defined by the OSGi Alliance (standardization body). The platform 301 includes a device driver group that can control various hardware devices and provides an application programming interface (API), which is necessary to use the hardware, for each application running on the platform 301. For example, a Bluetooth control unit 302 is a device driver dedicated to control the Bluetooth I/F 209. A network control unit 303 is a device driver dedicated to control the network I/F 210. Although not illustrated in the drawings, the platform 301 includes a printer module that can control the printer 206 and a scanner module that can control the scanner 207. Further, the platform 301 can provide the API, which is required to read and write the data of the advertizing information 322, the document 304, the print job 305, and the counter 306, for the application.

The MFP 101 includes applications, such as copy 308, print 309, and transmission 310, which are operating on the platform 301. To provide various functions, each application can display a user interface on the operation unit 205. For example, the copy 308 can control the scanner 207 and the printer 206 via the platform 301 to perform a copy operation. The print 309 provides a function of printing document data stored in the document 304 or a print job retained in the print job 305. A copy or print result can be output via the API of the platform 301. The platform 301 records the number of printed sheets in the counter 306. The transmission 310 provides a function of transmitting document data acquired by the scanner 207 to an external device. The MFP 101 includes menu 307, which is a module capable of displaying a menu on the operation unit 205 to enable a user to select a desired (e.g., copy, print, or transmission) application. The MFP 101 includes an MFP information service 311, which is a module capable of providing a user interface described in Hyper Text Markup Language (HTML) when a web browser of a PC accesses the MFP 101 by using Hyper Text Transfer Protocol (HTTP) protocols. More specifically, the MFP information service 311 can provide a user interface usable to manage MFP settings and a user interface usable to print document data stored in the document 304. The MFP 101 includes a login service 312, which is a module capable of providing a login function in operating the MFP.

<Outline of Login Service 312>

The login service 312 includes a user account management function and a local login management function.

A user interface, which can be provided by the user account management function, enables a user to register and manage the user account. When information is registered via the user interface, the login service 312 records and manages the registered information in the user account 313. The information to be managed by the login service 312 includes user name, password, IC card number, and role, for example, as illustrated in Table 1 (i.e., user information list).

TABLE 1

User Information List

| User Name | password | IC card number | Role |
|---|---|---|---|
| Alice | password1 | 01a1b2c3d4e5f6g1 | administrator |
| Bob | password2 | 01a1b2c3d4e5f6g2 | general user |
| Carol | password3 | 01a1b2c3d4e5f6g3 | general user |
| Dave | password4 | 01a1b2c3d4e5f6g4 | general user |

The local login management function provides a login/logout function for each user who uses the operation unit 205. It is assumed that only one user can perform a local login operation. In other words, a plurality of users cannot simultaneously perform the local login operation. If there is not any user who is currently in a local login state, the CPU 201 causes the operation unit 205 to display a login screen and prevents any user from using the MFP 101 without performing a login operation. If a user has succeeded in the login operation by using a later-described unit, the CPU 201 causes the operation unit 205 to display a menu screen so that the user can use the MFP 101. The MFP 101 provides the following login units respectively available for the local login operation.

As a keyboard login unit, the CPU 201 can display a soft keyboard on the login screen of the operation unit 205 to acquire a user name and a password from each user and can perform user authentication based on the acquired information and login processing based on the authentication result. The login operation is incomplete in a state where the CPU 201 displays the login screen. As an IC card login unit, the CPU 201 can acquire an IC card number from an IC card inserted in or located closely to an IC card reader provided in the operation unit 205 and can identify each user based on the acquired information and perform login processing based on the identification result. As a local login unit, the portable terminal 102 can transmit a login request to the MFP 101 by Bluetooth. The CPU 201 of the MFP 101 performs user authentication based on user authentication information received from the portable terminal 102 and performs local login processing based on the authentication result.

As mentioned above, two or more users cannot simultaneously perform the local login operation. Therefore, if there is one user who is already in a local login state, the CPU 201 rejects a local login request received from another user (portable terminal) to log in the MFP 101 even when the user authentication information includes no problem. In other words, the CPU 201 prioritizes a user who has earlier started the local login operation to operate the operation unit 205.

There is a plurality of logout units that are available after succeeding in the local login processing, as follows.

The CPU 201 causes the operation unit 205 to display a logout button and performs the logout processing when the act of pressing the logout button is detected. Further, the CPU 201 performs the logout processing if there is not any operation input via the operation unit 205 for a predetermined time. Further, the CPU 201 performs the logout processing in response to a logout request received from the portable terminal 102. The CPU 201 causes the operation unit 205 to display the login screen after completing the logout processing.

Figure 4:
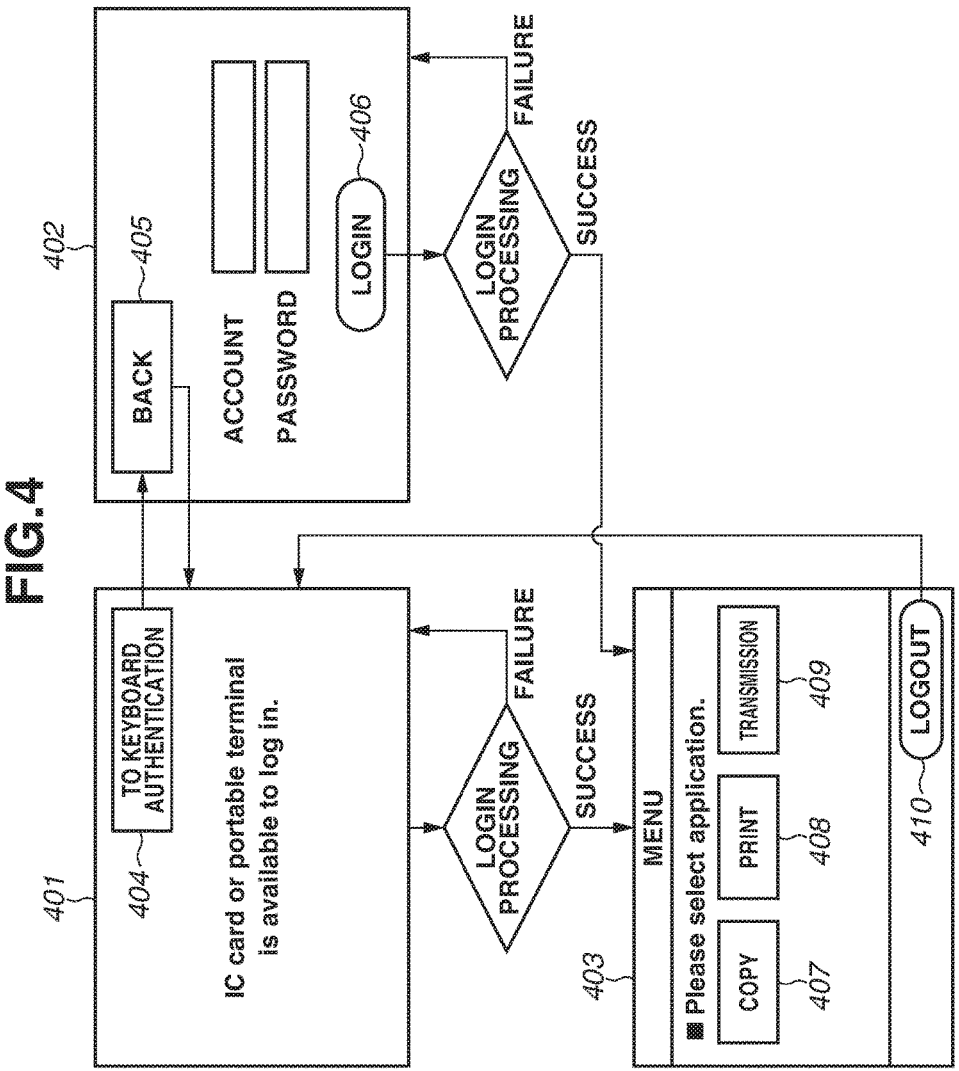
FIG. 4 illustrates an example of screen transitions.

FIG. 4 illustrates an example of screens, which can be displayed by the operation unit 205, and screen transitions relating to local login and local logout processing. For example, the CPU 201 displays a login screen 401 in a state where a login operation is not yet performed by a user. In this state, the CPU 201 can detect an IC card and receive a login request from the portable terminal 102 via Bluetooth. If an IC card is detected or a login request is received from the portable terminal 102 via Bluetooth, the CPU 201 performs the login processing. If the login operation has been successfully completed, the CPU 201 shifts the screen to a menu screen 403. If the login operation has been failed, the CPU 201 continuously displays the login screen 401. If the act of pressing keyboard authentication switching button 404 has been detected on the login screen 401, the CPU 201 shifts the screen to another login screen 402, which enables the user to input a user account and a password with the soft keyboard.

The login screen 402 includes a button 405 that is operable to return to the login screen 401. If the act of pressing a login button 406 has been detected, the CPU 201 performs login processing based on the account and the password having been entered by the user. If the login operation has been successfully completed, the CPU 201 shifts the screen to the menu screen 403. If the login operation has been failed, the CPU 201 continuously displays the login screen 402. The menu screen 403 includes a plurality of calling buttons (a copy button 407, a print button 408 and transmission button 409) operable to various applications and a logout button 410. If the act of pressing the logout button 410 has been detected, the CPU 201 performs logout processing and displays the login screen 401.

<Bluetooth Functions and Services of MFP>

In the MFP 101 according to the present exemplary embodiment, after completing the initialization processing in response to a turning-on operation of the power source, the platform 301 activates the Bluetooth via the Bluetooth control unit 302 and transmits a Bluetooth advertizing packet at intervals having been set beforehand. The MFP that transmits the Bluetooth advertizing packet is an example of a packet transmission source device. Communications using the Bluetooth advertizing packet conform to the Bluetooth Low Energy regulations. Hereinafter, the Bluetooth Low Energy is referred to as "BLE." The CPU 201 reads the advertizing information 322 from the flash memory 202, the RAM 203, or the HDD 204 and transmits the acquired information as an advertizing packet. The advertizing packet includes the following data.

Local Name

Local Name is a model name of each MFP (e.g., MFP XXXX). Machine Name can be defined as a characteristic illustrated in FIG. 5, which can be defined by Generic Attribute Profile (GATT) profile, and can be used an MFP model name.

Manufacturer Specific Data

Manufacturer Specific Data includes a corporate identifier and arbitrary data. The Manufacturer Specific Data can include Received Signal Strength Indication (RSSI), which is reception signal intensity (e.g., −59 dbm) measured in a case where a Bluetooth packet is received at a place 1 m away from the device.

TX Power Level

TX Power Level is transmission field intensity (e.g., −38 dBm).

Service UUIDs

UUID stands for Universally Unique Identifier that represents a function of the device. If two or more machines are identical in model type, their UUIDs may be identical to each other. For example, it is feasible to use 128-bit UUID.

Major Value and Minor Value

Major value and Minor value are usable as individual identifiers to perform individual identification if the UUID is identical. In a case both of the Major value and the Minor value are not transmitted, Serial Number can be defined as a characteristic illustrated in FIG. 5, which can be defined by the GATT profile, and can be used as an individual identifier.

Figure 5:
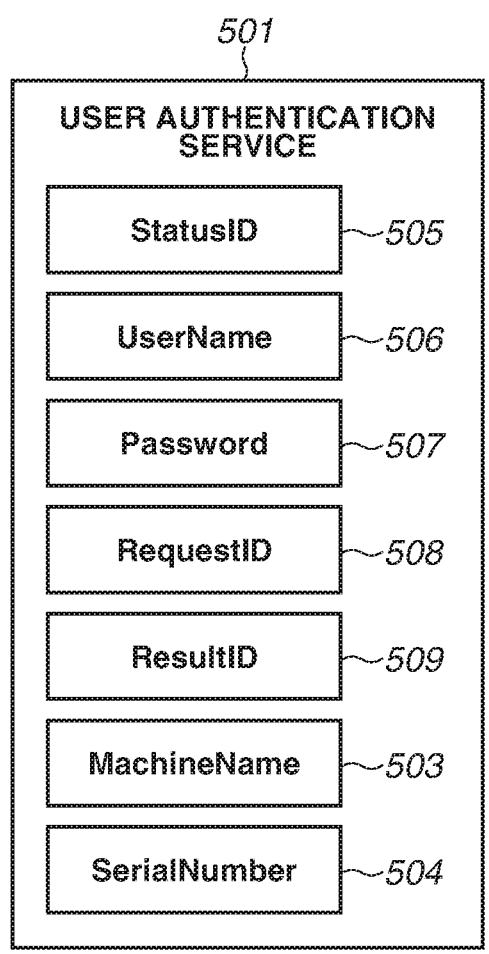
FIG. 5 illustrates an example of a user authentication service.

FIG. 5 illustrates an example of Bluetooth services that the MFP 101 includes. The MFP 101 according to the present exemplary embodiment communicates with a portable terminal that has transmitted a connection request according to an advertisement transmission by Bluetooth. The MFP 101 provides a user authentication service 501 for the connected portable terminal defined by the GATT profile.

The user authentication service 501 includes the following characteristics defined by the GATT profile. The login service 312 reads and writes values of respective characteristics via the API that the platform 301 and the Bluetooth control unit 302 can provide.

StatusID 505

StatusID 505 is a characteristic that indicates a state relating to the status of the MFP 101. The portable terminal 102 reads and uses the StatusID 505 to acquire the state relating to the status of the MFP 101. The portable terminal 102 can be configured in such a way as to cause the operation unit 205 to display the status of the MFP 101 according to the acquired status ID of the MFP 101. For example, values illustrated in the following table (StatusID list) can be stored.

TABLE 2

StatusID List

| StatusID | Meaning |
| --- | --- |
| 1 | Print in progress |
| 2 | Standby |
| 3 | Sleep state |

The login service 312 changes the value of the StatusID 505 according to a change of the state. If a value change occurs, the Bluetooth control unit 302 notifies the currently connected portable terminal of the value change, with Notification defined by Attribute Protocol (ATT).

UserName 506

UserName 506 is a characteristic required for the portable terminal 102 to write a user name in the login request.

Password 507

Password 507 is a characteristic required for the portable terminal 102 to write a password in the login request. The Password 507 can be constituted as a characteristic that requires encryption.

RequestID 508

RequestID 508 is a characteristic required for the portable terminal 102 to write a request to the authentication service 501. For example, requests illustrated in the following table (RequestID list) can be written.

TABLE 3

RequestID List

| RequestID | Meaning |
| --- | --- |
| 1 | local login request |
| 2 | local logout request |

ResultID 509

ResultID 509 is a characteristic required for the MFP 101 to store a result (success/failure) in user authentication performed in response to a login request from the portable terminal 102. Further, in addition to notifying the login request, the ResultID 509 is a characteristic usable to notify a user who has logged out. For example, the ResultID 509 stores various values illustrated in the following Table 4 (i.e., ResultID List).

TABLE 4

ResultID List

| ResultID | Meaning |
| --- | --- |
| 1 | login permission |
| 2 | login rejection |
| 3 | cancellation due to other user's login state |
| 4 | other error |
| 5 | logout notification |
| 6 | cancellation due to own login state |

When the authentication result is stored, the Bluetooth control unit 302 notifies the currently connected portable terminal of the authentication result, with the Notification defined by Attribute Protocol (ATT).

Further, the user authentication service 501 can be configured to define MachineName 503, which is usable as an MFP model name. Further, the user authentication service 501 can be configured to define SerialNumber 504, which is usable as an individual identifier.

Each of the above-mentioned services and characteristics includes handle, UUID, data type information, and text information.

<Basic Information Processing Performed by MFP>

Figure 6:
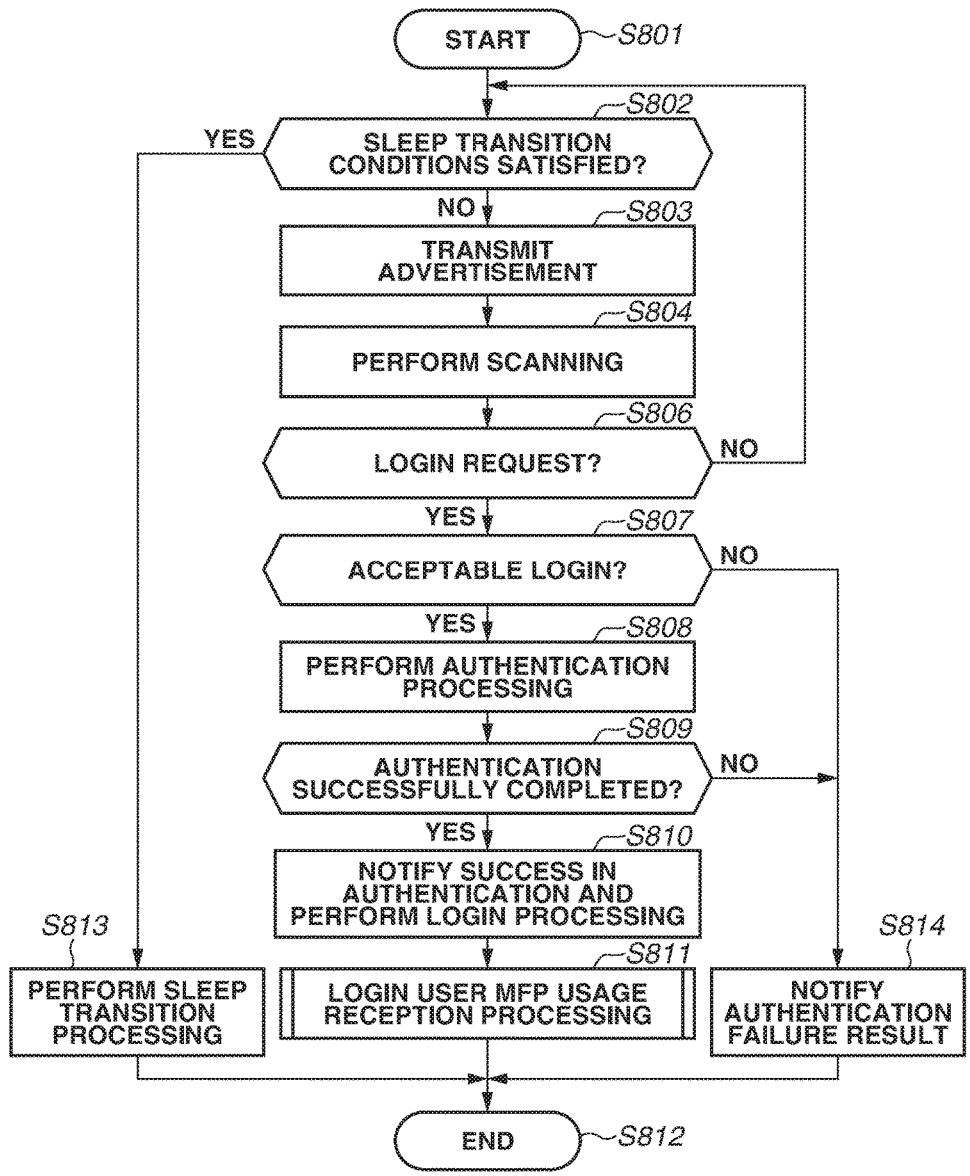
FIG. 6 is a flowchart illustrating information processing that can be performed by the MFP.

FIG. 6 is a flowchart illustrating information processing that can be performed by the MFP. The information processing will be described in detail below with reference to FIG. 6. Unless otherwise specified, the CPU 201 of the MFP mainly controls operations of the MFP.

If the power source of the MFP 101 is turned on, the CPU 201 starts controlling the MFP 101 according to the programs read from the flash memory 202 and/or the HDD 204. In step S801, the CPU 201 starts processing. The CPU 201 initializes the MFP 101. Upon completing the initialization, the MFP 101 is brought into a standby state. Then, the operation of the CPU 201 proceeds to step S802.

In step S802, the CPU 201 determines whether the MFP 101 satisfies sleep transfer conditions. The sleep transfer conditions includes a condition that there is not any job having been entered for a predetermined time, a condition that there is not any login user, and a condition that there is not any login request.

If it is determined that the MFP 101 satisfies the sleep transfer conditions (YES in step S802), the operation of the CPU 201 proceeds to step S813. If it is determined that the MFP 101 does not satisfy the sleep transfer conditions (NO in step S802), the operation of the CPU 201 proceeds to step S803. In step S813, the CPU 201 causes the MFP 101 to shift into the sleep mode (i.e., power saving state). To this end, the CPU 201 controls the printer 206, the scanner 207, the HDD 204, and the operation unit 205 in such a way as to stop the operations of their display devices and partly turns off the power source. On the other hand, to monitor any sleep restoration factor (e.g., a job entry, a login request, or an operation start), the CPU 201 does not stop the operations of the IC card reader 208, the Bluetooth I/F 209, the network I/F 210, and a key operation monitoring circuit of the operation unit 205. If the CPU 201 completes the sleep transfer processing, the operation of the CPU 201 proceeds to step S812, in which the CPU 201 terminates the processing of the flowchart illustrated in FIG. 6 to wait for a while until the sleep restoration time comes.

In step S803, the CPU 201 transmits an advertisement as a slave of the BLE. The CPU 201 reads the advertizing information 322 from the RAM 203 or the HDD 204. The CPU 201 controls the Bluetooth I/F 209 in such a way as to transmit advertisement data at predetermined intervals. The data to be transmitted in this case is the data indicated by the above-mentioned <Bluetooth functions and services of MFP>. Then, the operation of the CPU 201 proceeds to step S804.

In step S804, the CPU 201 performs scanning processing for detecting a connection request from a master of the BLE. The CPU 201 controls the Bluetooth I/F 209 in such a way as to perform scanning processing for receiving data at predetermined intervals. If the connection request is received from the master of the BLE, the CPU 201 performs connection processing, as a slave, and transmits and receives data to and from the master. The CPU 201 provides the service defined by the Bluetooth based GATT profile to enable the portable terminal to perform local login processing when connected to the MFP. More specifically, the CPU 201 opens the Bluetooth based user authentication service 501 to the public. It is feasible to transmit and receive information by reading and writing the characteristic of the user authentication service 501. Then, the operation of the CPU 201 proceeds to step S806.

In step S806, the CPU 201 determines whether a login request has been received from the user. The CPU 201 performs the processing described in the above-mentioned <Outline of Login Service 312>. If the writing to the UserName 506, the Password 507, or the RequestID 508 (i.e., one characteristic of the user authentication service 501) is performed, the CPU 201 determines that there is a local login request from the portable terminal. Then, the operation of the CPU 201 proceeds to step S807. Similarly, if a login request using the keyboard or an IC card is detected, the operation of the CPU 201 proceeds to step S807. If no login request has been detected (NO in step S806), the processing of the CPU 201 returns to step S802.

In step S807, the CPU 201 determines whether logging in the function indicated by the login request is acceptable. For example, in a case where a local login request is received from a user (from a portable terminal) in a state where another user is already performing a local login operation, the CPU 201 determines that performing login processing according to the request is impossible. In the case of portable terminal originated local login processing, the CPU 201 detects the writing of ID indicating the login request in the RequestID 508 of the user authentication service 501. Next, the CPU 201 acquires the login request from the value written in the RequestID 508 and determines whether the login request is acceptable. If the CPU 201 determines that logging in the function indicated by the login request is feasible, the operation of the CPU 201 proceeds to step S808. If the CPU 201 determines that logging in the function indicated by the login request is unfeasible, the operation of the CPU 201 proceeds to step S814.

In step S808, the CPU 201 performs user authentication processing. In the case of keyboard login processing, the CPU 201 collates ID and password input via the operation unit 205 with ID and password recorded in the user information list registered beforehand for the MFP. In the case of IC card login processing, the CPU 201 detects an IC card inserted in or located closely to the IC card reader. Then, the CPU 201 acquires the IC card number through communications to be performed between the IC card reader and the IC card. The CPU 201 collates the acquired IC card number with an IC card number recorded in the user information list registered beforehand for the MFP. In the case of portable terminal originated local login processing, the CPU 201 acquires user name and password with reference to the UserName 506 and the Password 507 written by a user of the portable terminal. The CPU 201 collates the acquired values with information recorded in the user information list registered beforehand for the MFP 101. Through the above-mentioned processing, the CPU 201 associates the user authentication result with the user account 313 and stores the result in the RAM 203, the HDD 204, or the flash memory 202. Subsequently, the operation of the CPU 201 proceeds to step S809.

In step S809, the CPU 201 determines whether the user authentication has been successfully completed. The CPU 201 reads the result of the user authentication performed in step S808 from the RAM 203, the HDD 204, or the flash memory 202. If the result indicates that the user authentication has been successfully completed (YES in step S809), the operation of the CPU 201 proceeds to step S810. If the result indicates that the user authentication has been failed (NO in step S809), the operation of the CPU 201 proceeds to step S814.

In step S810, the CPU 201 notifies the success in authentication and performs login processing. In the case of portable terminal originated local login processing, the CPU 201 sets the authentication result to the ResultID 509 and transmits the Notification notifying the result of the login processing to the portable terminal, from which the login request has been received.

Then, the CPU 201 causes the operation unit 205 to shift the display screen from the login screen to the menu screen, and notifies the success in authentication. The CPU 201 stores information about the successfully logged-in user while associating it with the user account 313 and enables the login user to use the MFP. The CPU 201 sets a user login flag corresponding to the user account 313 in the RAM 203, the HDD 204, or the flash memory 202, according to the user authentication result. Then, the operation of the CPU 201 proceeds to step S811.

In step S811, the CPU 201 performs login user MFP usage reception processing. Details of the processing to be performed in step S811 will be described with reference to FIG. 7. After the login processing has been successfully completed, the user can start using the MFP 101. The CPU 201 performs processing according to a received user operation. The CPU 201 performs the login user MFP usage reception processing and the MFP information processing concurrently. Therefore, the operation of the CPU 201 proceeds to step S812.

In step S814, the CPU 201 notifies the user of failure in authentication. In the case of portable terminal originated local login processing, the CPU 201 sets the authentication result to the ResultID 509 and transmits the Notification notifying the result of the login processing to the portable terminal, from which the login request has been received. In the case of keyboard login processing or IC card login processing, the CPU 201 causes the operation unit 205 to display a message "User authentication has been failed." on the login screen.

If the operation proceeds from step S807 to step S814, the CPU 201 notifies that the user authentication has been failed because another user is in a local login state. In the case of portable terminal originated local login processing, the CPU 201 sets the authentication result to the ResultID 509 and transmits the Notification notifying the result of the login processing to the portable terminal, from which the login request has been received. In the case of keyboard login processing or IC card login processing, the CPU 201 causes the operation unit 205 to display a message "Login is rejected because of the presence of another login user." on the login screen.

Then, the operation of the CPU 201 proceeds to step S812.

In step S812, the CPU 201 performs various termination processing. For example, in the case of portable terminal originated local login processing, the CPU 201 closes each service defined by the Bluetooth based GATT profile. If the operation mode of the MFP is standby, the CPU 201 continues to control the MFP. Therefore, the processing returns to step S801.

Figure 7:
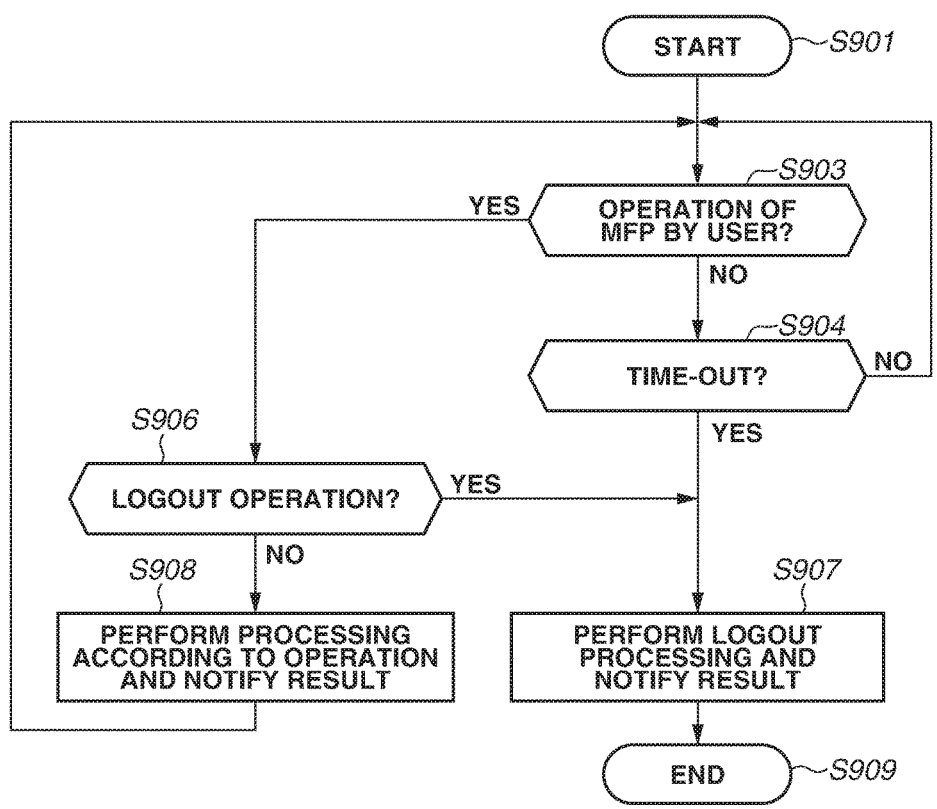
FIG. 7 is a flowchart illustrating detailed processing to be performed in step S811.

FIG. 7 is a flowchart illustrating details of the processing to be performed in step S811. The login user MFP usage reception processing (i.e., the processing to be performed in step S811) will be described in detail below with reference to FIG. 7. If the login processing has been successfully completed, the CPU 201 starts the login user MFP usage reception processing. Namely, the CPU 201 starts processing in step S901. Then, the operation of the CPU 201 proceeds to step S903.

In step S903, the CPU 201 determines whether the user has operated the MFP. In the case of the local login processing, if a user operation via the operation unit 205 has been detected (YES in step S903), the operation of the CPU 201 proceeds to step S906. Otherwise, the operation of the CPU 201 proceeds to step S904.

In step S906, the CPU 201 determines whether the user operation is a logout operation. In the case of local login processing, if the logout operation via the operation unit 205 has been detected (YES in step S906), the operation of the CPU 201 proceeds to step S907. Otherwise, the operation of the CPU 201 proceeds to step S908.

In step S908, the CPU 201 performs processing according to the operation and notifies processing results. In the case of local login processing, if a copy instruction is input via the operation unit 205, the CPU 201 causes the printer 206 to perform an instructed copy operation and causes the operation unit 205 to displays copy results. Then, the operation of the CPU 201 returns to step S903.

In step S907, the CPU 201 performs logout processing and notifies processing results. The CPU 201 stores information about the logged-out user while associating it with the user account 313 and prohibits the logout user from using the MFP. The CPU 201 unsets the user login flag corresponding to the user account 313 in the RAM 203, the HDD 204, or the flash memory 202.

In the case of local login processing, the CPU 201 causes the operation unit 205 to display the login screen again. In the case of local login processing requested from the portable terminal 102, the CPU 201 transmits the Notification, notifying update results of the ResultID 509 and the StatusID 505, to the portable terminal 102. Thus, it is known that the user authenticated by the portable terminal 102 has logged out of the MFP 101. Therefore, in later-described step S615, the CPU 211 of the portable terminal 102 can confirm the logout result.

Subsequently, the operation of the CPU 201 proceeds to step S909.

In step S909, the CPU 201 terminates the login user MFP usage reception processing. Then, the processing of the CPU 201 returns to step S812 (i.e., the MFP information processing).

In step S904, the CPU 201 determines whether user non-operating time exceeds a predetermined value. In other words, the CPU 201 determines whether time-out has been detected. If it is determined that the user non-operating time has exceeded the predetermined value (YES in step S904), namely, when the time-out is detected, the operation of the CPU 201 proceeds to step S907. If it is determined that the user non-operating time does not exceed the predetermined value (NO in step S904), namely, when the time-out is not detected, the operation of the CPU 201 returns to step S903.

<Software Configuration of Portable Terminal 102>

Figure 8:
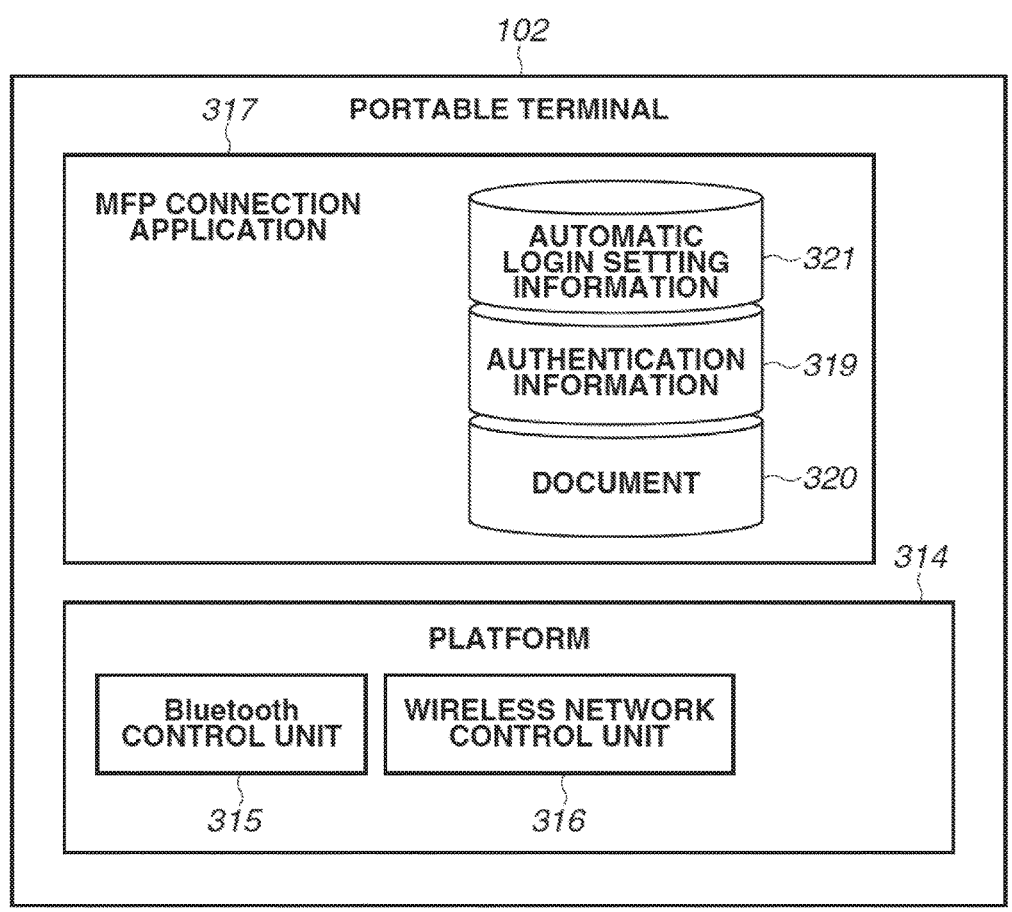
FIG. 8 illustrates an example of a software configuration of a portable terminal.

FIG. 8 illustrates an example of a software configuration of the portable terminal 102. Automatic login setting information 321, document 320, and authentication information 319 are data regions for the data stored in the flash memory 213 that can be managed by the software. A platform 314 can be constituted by the Android (registered trademark) platform or the iOS (registered trademark) platform. The platform 314 includes a device driver group that can control various hardware devices and provides an API, which is necessary to use various hardware devices, for each application running on the platform.

In the present exemplary embodiment, the platform 314 includes a Bluetooth control unit 315 and a wireless network control unit 316, which constitute the device driver group. The Bluetooth control unit 315 is a device driver capable of controlling the Bluetooth I/F 215. The wireless network control unit 316 is a device driver capable of controlling the wireless network I/F 216. The Bluetooth control unit 315 receives Bluetooth data and BLE advertisement information from another device at appropriate timing and sends the received data and information to the platform 314.

It is feasible to install various applications on the portable terminal 102. The installed application can run on the platform 314. In the present exemplary embodiment, it is assumed that an MFP connection application 317 is installed beforehand. In response to a request of the MFP connection application 317, the platform 314 can send the BLE advertisement information and perform Bluetooth data transmission/reception processing. For example, the MFP connection application 317 includes the following functions.

The MFP connection application 317 changes and stores the automatic login setting information 321 according to a user instruction.

The MFP connection application 317 determines whether to connect to the MFP by Bluetooth and transmit a local login request based on a comparison result obtainable by comparing the BLE advertisement information received from the platform 314 and the measurement distance with the automatic login setting information 321.

The MFP connection application 317 uses user authentication information (e.g., user name and password) recorded beforehand in the authentication information 319 for the login request. For example, authentication information illustrated in the following Table 5 can be stored.

TABLE 5

| Authentication Information | |
|---|---|
| Item | |
| User Name | Alice |
| Password | password1 |

The MFP connection application 317 performs logout request processing.

The MFP connection application 317 displays the automatic login setting information 321 and performs processing for locally logging in a manually selected MFP while ignoring a distance having been set by the automatic login setting information 321.

The automatic login setting information 321 holds setting values illustrated in FIG. 9. According to FIG. 9, if the model name is MFP A, a portable terminal automatically performs local login request processing when the portable terminal enters the Immediate zone of the MFP A. Further, if the model name is MFP B, a portable terminal automatically performs local login request processing when the portable terminal enters the Immediate zone of the MFP B. On the other hand, if the model name is MFP C, a portable terminal does not automatically perform local login request processing irrespective of the distance between the portable terminal and MFP C. According to the example illustrated in FIG. 1, it is assumed that the MFP 101 is MFP A, the MFP 103 is MFP B, and the MFP 106 is MFP C.

The automatic login feasibility and automatic login distance settings illustrated in FIG. 9 can be changed by a user of the portable terminal.

A distance that can be calculated when the platform 314 of the portable terminal receives a BLE advertizing packet from the MFP is usable in measuring the distance between the MFP and the portable terminal. The measured distance can be classified into four types of conceptual zones, i.e., Immediate zone (a short-range zone within the distance of approximately 2 cm, which is nearly a state of non-contact), Near zone (a medium-range zone within approximately 2 m), Far zone (a long-range zone within approximately 10 m), and Unknown (an undetectable zone). The platform 314 calculates the above-mentioned distance based on TX Power Level and RSSI of the BLE advertizing packet. The RSSI value may decrease when an obstacle enters between the portable terminal and the MFP. Therefore, The RSSI value may not coincide with the above-mentioned distance.

<Automatic Login Setting Related Information Processing Performed by Portable Terminal>

Figure 10:
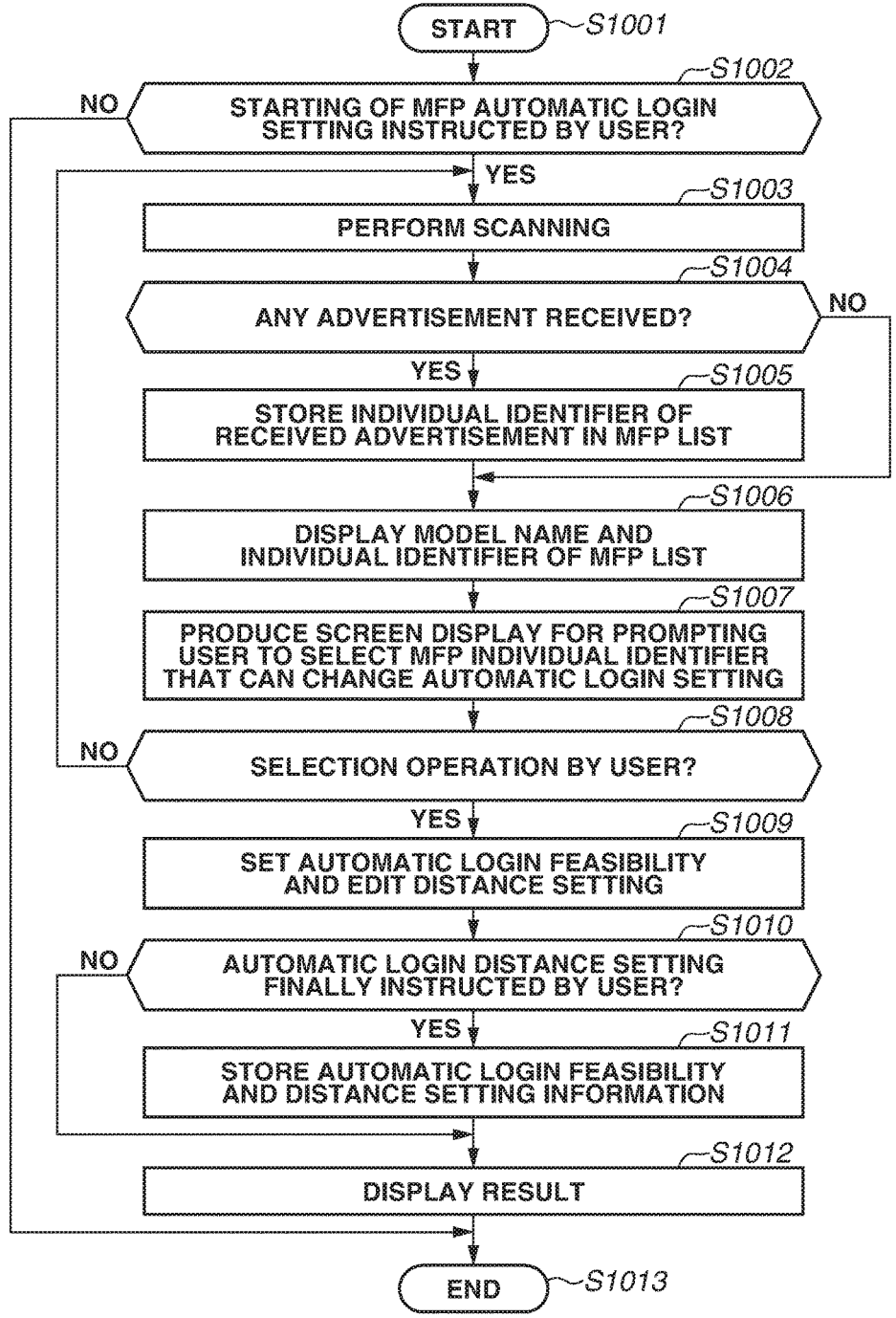
FIG. 10 is a flowchart illustrating an example of automatic login setting information related processing.

FIG. 10 is a flowchart illustrating an example of the automatic login setting to be performed when the portable terminal has approached the MFP. Hereinafter, a method for setting the automatic login setting information when the portable terminal has approached the MFP will be described in detail below with reference to FIG. 10. The automatic login setting information, having the data structure illustrated in FIG. 9, can be stored in the automatic login setting information 321 of the portable terminal 102. The CPU 211 uses the automatic login setting information in determining whether to automatically log in the MFP in step S606 described below. Unless otherwise specified, the CPU 211 mainly performs the processing to be performed by the portable terminal.

It is assumed that the CPU 211 initializes the portable terminal when the power source of the portable terminal is tuned on. Upon completing the initialization, the portable terminal is brought into a standby state. The portable terminal includes the MFP connection application 317 installed thereon.

If the CPU 211 detects an execution instruction of the MFP connection application 317 input by a user, then in step S1001, the CPU 211 performs processing of the flowchart illustrated in FIG. 10. Then, the operation of the CPU 211 proceeds to step S1002.

In step S1002, the CPU 211 determines whether a user has instructed to start MFP automatic login setting. If the CPU 211 detects the instruction of the user who instructed to start the MFP automatic login setting (YES in step S1002), the operation of the CPU 211 proceeds to step S1003 in which the CPU 211 starts MFP automatic login setting processing. Usually, the user inputs an instruction to start the MFP connection application 317 via the operation unit 214.

Then, the user instructs to activate an MFP automatic login setting function included in the above-mentioned application. Alternatively, in step S605 of a later-described flowchart (i.e., basic information processing of the portable terminal), the CPU 211 can be configured to inquire the user whether to activate the MFP automatic login setting function if an advertisement is received from an MFP not set in the automatic login setting information. Subsequently, if the user instructs to activate the MFP automatic login setting function via the operation unit 214, the CPU 211 activates the MFP connection application 317.

If the CPU 211 detects that the user has not instructed to start the MFP automatic login setting (NO in step S1002), the operation of the CPU 211 proceeds to step S1013. The CPU 211 does not perform the MFP automatic login setting processing.

In step S1003, the CPU 211 performs scanning processing for receiving a Bluetooth advertizing packet. Then, the operation of the CPU 211 proceeds to step S1004.

In step S1004, the CPU 211 determines whether there is any advertisement received from another device. If it is determined that the advertisement has been received from another device (YES in step S1004), the operation of the CPU 211 proceeds to step S1005. If it is determined that there is not any advertisement received from another device (NO in step S1004), the operation of the CPU 211 proceeds to step S1006.

In step S1005, the CPU 211 stores the individual identifier of the received advertisement as the automatic login setting information 321.

The CPU 211 stores the Service UUIDs of the advertisement, as UUID (see FIG. 9) of the automatic login setting information 321, in a 128-bit (16-byte) format. The CPU 211 stores 4-byte data, consisting of 2-byte Major value and 2-byte Minor value, as the individual identifier (see FIG. 9) of the automatic login setting information 321. The CPU 211 stores other values while associating them with UUID, Major value, and Minor value of the automatic login setting information 321. The CPU 211 stores the Local Name of the advertisement, as model name (see FIG. 9) of the automatic login setting information 321.

If necessary, the CPU 211 can be configured to function as a master of the BLE to transmit a Bluetooth connection request to the MFP 101. In this case, the CPU 211 accesses the service defined by the Bluetooth based GATT profile, and then acquires and uses the following information. More specifically, the CPU 211 can be configured to read MachineName 503 (i.e., one characteristic of the user authentication service 501) by the Bluetooth communication and use the acquired information as an MFP model name. Further, the CPU 211 can be configured to read the Serial- Number 504 (i.e., one characteristic of the user authentication service 501) and use the acquired information as an individual identifier. The CPU 211 sets local login (NO) as a default value of the automatic login setting information illustrated in FIG. 9. Then, the operation of the CPU 211 proceeds to step S1006.

Figure 11:
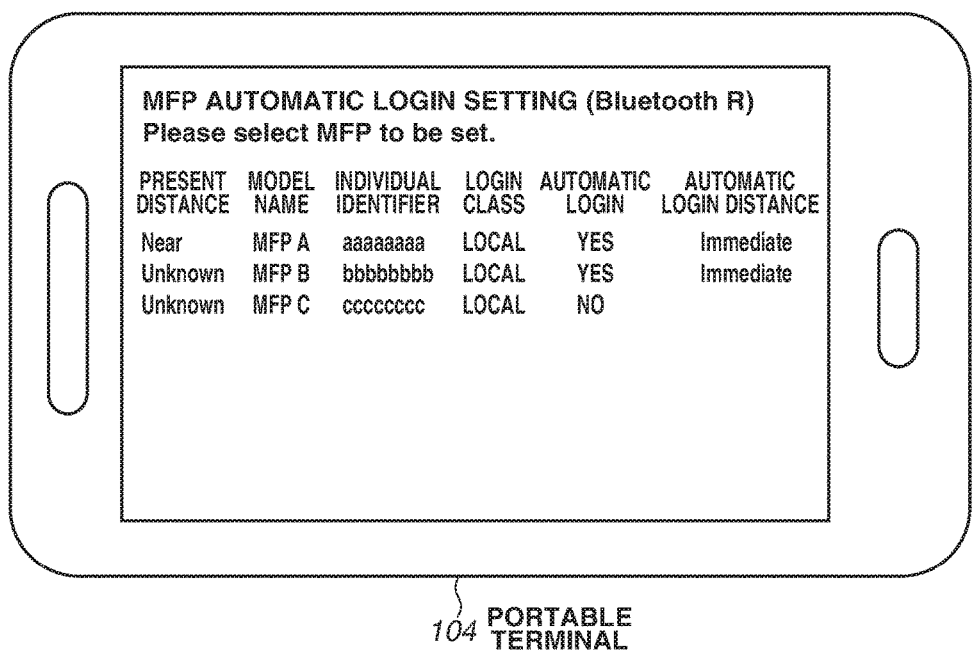
FIG. 11 illustrates an example of a screen image (Part 1) that can be displayed by an operation unit.

In step S1006, the CPU 211 causes the operation unit 214 to display details of the automatic login setting information 321 (i.e., model name, individual identifier, login class, automatic login feasibility, and automatic login distance) illustrated in FIG. 9. FIG. 11 illustrates a screen image displayed on the operation unit 214 of the portable terminal 102. If the distance between the portable terminal and the MFP decreases to a setting value of the automatic login distance, the portable terminal automatically logs in the MFP. If the automatic login item is set to NO, the setting of the automatic login distance becomes invalid. If desired, the screen image illustrated in FIG. 11 can be configured to include a field of UUID additionally. Further, the CPU 211 can be configured to calculate the distance between the MFP and the portable terminal based on the received advertisement packet and cause the operation unit 214 to display the present distance of each MFP appropriately. Then, the operation of the CPU 211 proceeds to step S1007.

In step S1007, the CPU 211 causes the operation unit 214 to perform a screen display for prompting the user to select an MFP individual that can change the automatic login setting information. A character portion "Please select MFP to be set" illustrated in FIG. 11 is a screen image corresponding to the processing in step S1007. Then, the operation of the CPU 211 proceeds to step S1008.

In step S1008, the CPU 211 determines whether a selection operation by the user has been detected. If the CPU 211 detects an MFP model name selected (pressed) by the user on the operation unit 214 (YES in step S1008), the operation of the CPU 211 proceeds to step S1009. If the CPU 211 cannot detect any MFP model name selected (pressed) by the user on the operation unit 214, for example, for a predetermined time (NO in step S1008), the operation of the CPU 211 returns to step S1003.

Figure 12:
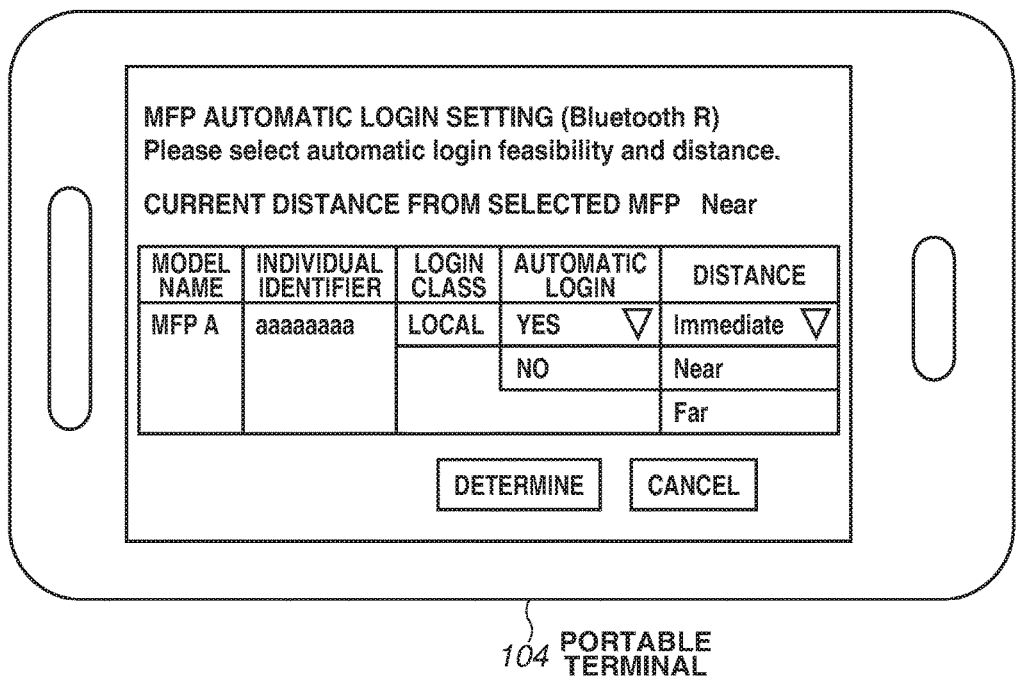
FIG. 12 illustrates an example of a screen image (Part 2) that can be displayed by the operation unit.

In step S1009, the CPU 211 edits the automatic login feasibility and automatic login distance settings of the selected MFP. The CPU 211 can edit the automatic login feasibility and the automatic login distance according to the model name and the individual identifier of the MFP selected by the user in step S1008. FIG. 12 illustrates a screen image usable in this case. Further, the CPU 211 can be configured to calculate the distance between the selected MFP and the portable terminal based on the received advertisement packet and cause the operation unit 214 to display a calculation result (e.g., "Present distance from selected MFP: Near") appropriately.

The CPU 211 causes the operation unit 214 to display a screen image so that the user can set "YES" or "NO" with respect to the automatic login item. If the CPU 211 detects a user selection of "YES" for the automatic login setting, the CPU 211 causes the operation unit 214 to display automatic login distance zones (e.g., "Immediate", "Near", and "Far") that the user can select. Thus, the user can select one of the distance zones (e.g., "Immediate", "Near", and "Far"). On the other hand, if the user selects "NO" for the automatic login setting, the CPU 211 grays out the display of "Immediate", "Near", and "Far" in the automatic login distance field so that the user cannot select any one of them. Thus, the user cannot select any one of "Immediate", "Near", and "Far."

Then, the operation of the CPU 211 proceeds to step S1010.

The screen images illustrated in FIGS. 11 and 12 are examples of the setting screen. The CPU 211 designates and sets information about the automatic login feasibility and the automatic login distance according to a user operation performed on the setting screen.

In step S1010, the CPU 211 determines whether the user has finally instructed the automatic login setting information. If the CPU 211 detects a user selection of "final" on the operation unit 214 (YES in step S1010), the operation of the CPU 211 proceeds to step S1011. If the CPU 211 detects a user selection of "cancel" on the operation unit 214 (NO in step S1010), the operation of the CPU 211 proceeds to step S1012.

In step S1011, the CPU 211 stores the automatic login feasibility and automatic login distance settings of the MFP having been edited in step S1009 as the automatic login setting information 321. For example, if the CPU 211 detects a user selection of "NO" for the automatic login setting in step S1009, the CPU 211 stores the finalized settings of automatic login "NO" and automatic login distance "invalid" as the automatic login setting information 321. On the other hand, if the CPU 211 detects a user selection of "YES" for the automatic login setting and "Immediate" for the automatic login distance setting, the CPU 211 stores the settings of automatic login "YES" and automatic login distance "Immediate" as the automatic login setting information 321. Further, if the CPU 211 detects a user selection of "YES" for the automatic login setting and "Near" for the automatic login distance setting, the CPU 211 stores the settings of automatic login "YES" and automatic login distance "Near" as the automatic login setting information 321. Further, if the CPU 211 detects a user selection of "YES" for the automatic login setting and "Far" for the automatic login distance setting, the CPU 211 stores the settings of automatic login "YES" and automatic login distance "Far" as the automatic login setting information 321. Then, the operation of the CPU 211 proceeds to step S1012.

In step S1012, the CPU 211 causes the operation unit 214 to display the results selected by the user. For example, if it is detected that the user has selected "cancel" in step S1010, the CPU 211 causes the operation unit 214 to display a message "Settings have been cancelled." for a predetermined time. Then, the operation of the CPU 211 proceeds to step S1013 (namely, the CPU 211 returns to the standby state). Further, if it is detected that the user has selected "final" in step S1010, the CPU 211 causes the operation unit 214 to display the finalized automatic login feasibility and automatic login distance settings of the MFP for a predetermined time. Then, the operation of the CPU 211 proceeds to step S1013 (namely, the CPU 211 returns to the standby state).

In step S1013, the CPU 211 terminates the automatic login setting processing and performs termination processing to return to the standby state.

<Basic Information Processing by Portable Terminal>

FIG. 13 is a flowchart illustrating information processing that can be performed by the portable terminal. Hereinafter, the information processing to be performed when the portable terminal approaches the MFP and starts using the MFP will be described with reference to FIG. 13. Unless otherwise specified, the CPU 211 of the portable terminal 102 mainly controls operations of the portable terminal 102. Further, the CPU 211 executes software of the platform and the MFP connection application. In advertisement packet reception or in Bluetooth communication, the CPU 211 causes the MFP connection application 317 to call and process the API provided by the platform.

It is assumed that the CPU 211 initializes the portable terminal when the power source of the portable terminal is turned on. Upon completing the initialization, the portable terminal is brought into a standby state. The operation of the CPU 211 proceeds to step S601, in which the CPU 211 starts the information processing. Then, the operation of the CPU 211 proceeds to step S602.

In step S602, the CPU 211 performs scanning processing for receiving the Bluetooth advertizing packet. Then, the operation of the CPU 211 proceeds to step S603.

In step S603, the CPU 211 determines whether there is any advertisement received from another device. If it is determined that there is an advertisement received from another device (YES in step S603), the operation of the CPU 211 proceeds to step S604. If it is determined that there is not any advertisement received from another device (NO in step S603), the operation of the CPU 211 returns to step S602.

In step S604, the CPU 211 calculates the distance between the portable terminal and the MFP that has transmitted the advertizing packet with reference to field intensity information calculated based on the advertizing packet. The CPU 211 calculates the distance with reference to TX Power Level of the received advertizing packet, and a difference between the RSSI and information about the transmission field intensity transmitted from the MFP and included in the Manufacturer Specific Data. Because the RSSI value includes an error component, the CPU 211 can calculate the distance by sampling a plurality of advertizing packets. More specifically, the platform 314 performs the above-mentioned distance calculation. The distance calculated by the platform 314 can be classified into three distance zones "Immediate", "Near", and "Far", which are arranged in short-distance order. If the advertisement packet cannot be detected by the platform 314 or calculating the distance is failed, the platform 314 determines that the distance is in the Unknown zone. The CPU 211 sends the distance value calculated by the platform 314 to the MFP connection application 317. The MFP connection application 317 stores the calculated distance. Then, the operation of the CPU 211 proceeds to step S605.

In step S605, the CPU 211 confirms whether the calculated distance coincides with the automatic login distance condition of the corresponding automatic login setting information illustrated in FIG. 9. The CPU 211 refers to Local-Name, Service UUIDs, Major, and Minor values included in the received advertizing packet. If necessary, the CPU 211 can be configured to function as a master of the BLE to transmit a Bluetooth connection request to the MFP 101. In this case, the CPU 211 accesses the service defined by the Bluetooth based GATT profile, and then acquires and may use the following information. More specifically, the CPU 211 can be configured to read the MachineName 503 (i.e., one characteristic of the user authentication service 501) by the Bluetooth communication and use the acquired information as an MFP model name. Further, the CPU 211 can be configured to read the SerialNumber 504 (i.e., one characteristic of the user authentication service 501) and use the acquired information as an individual identifier. The CPU 211 compares the distance from the MFP (i.e., the value acquired in step S604) with the value of the automatic login setting information 321. If the target MFP satisfies the following three conditions, the CPU 211 determines whether to perform automatic login processing and stores the result.

First condition: If the LocalName, Service UUIDs, Major, and Minor values coincide with the automatic login setting information, the CPU 211 determines that the target MFP is a desired MFP. If necessary, the CPU 211 can be configured to use the MachineName 503 as an MFP model name and use the SerialNumber 504 as an individual identifier. Further, the CPU 211 can be configured to refer to a part of the above-mentioned values in the comparison.

Second condition: the CPU 211 determines that the target MFP satisfies the distance condition if the distance acquired in step S604 is within a distance setting value of the automatic login setting information. If the calculated distance is in the Immediate zone, the CPU 211 determines that the target MFP satisfies the distance condition when the distance setting value is any one of Immediate, Near, and Far zones. Further, if the calculated distance is in the Near zone, the CPU 211 determines that the target MFP satisfies the distance condition when the distance setting value is Near or Far. Further, if the calculated distance is in the Far zone, the CPU 211 determines that the target MFP satisfies the distance condition only when the distance setting value is Far. Further, if the calculated distance is in the Unknown zone, the CPU 211 determines that the target MFP does not satisfy the distance condition.

Third condition: To prevent the MFP being already in a local login state from receiving a login request again, a local login state flag is provided for each MFP and stored in the RAM 212. The CPU 211 can manage the login state of each MFP individual based on the login state flag as illustrated in the following table.

TABLE 6

| Login state flag (Bluetooth) | | | | |
|---|---|---|---|---|
| UUID | Model Name | Individual Identifier | Login class | Login state flag |
| aaaa aaaa-aaaa-aaaa-aaaa- aaaa aaaa aaaa | MFP A | aaaaaaaa | local | logout |
| bbbb bbbb-bbbb-bbbb-bbbb-bbbb bbbb bbbb | MFP B | bbbbbbbb | local | logout |
| cccc cccc-cccc-cccc-cccc-cccc cccc cccc | MFP C | cccccccc | local | logout |

If the above-mentioned local login state flag indicates the login state, the login request is not transmitted again. Therefore, the CPU 211 determines that the target MFP does not satisfy the third condition. If the login state is not indicated by the above-mentioned local login state flag, the CPU 211 determines that the target MFP satisfies the third condition. For example, if the above-mentioned local login state flag indicates the login state, the target MFP does not satisfy the third condition even when the first and second conditions are satisfied. Therefore, as a finalized result, the CPU 211 determines that the target MFP does not satisfy the automatic login conditions. For example, according to the automatic login conditions of MFP A illustrated in FIG. 11, the CPU 211 determines that the target MFP satisfies the automatic login conditions when the distance between the portable terminal 102 and the MFP A (i.e., the desired MFP) is in the Immediate zone and the login state flag indicates the logout state.

Then, the operation of the CPU 211 proceeds to step S606.

In step 3606, the CPU 211 determines whether the target MFP satisfies the login conditions. If the comparison result in step S605 reveals that the target MFP satisfies the automatic login conditions (YES in step S606), the operation of the CPU 211 proceeds to step S607. If the CPU 211 determines that the target MFP does not satisfy the automatic login conditions (NO in step S606), the operation returns to step S602.

In step S607, the CPU 211 establishes a Bluetooth connection with the MFP that has satisfied the automatic login conditions (i.e., another device (transmission source) that has transmitted the advertisement received in step S603), and transmits a login request to this MFP. Unless otherwise specified, hereafter, the portable terminal and the MFP perform Bluetooth based data communications. Next, the portable terminal acquires Bluetooth service information from the MFP.

In transmitting the local login request, the CPU 211 accesses the user authentication service 501. The CPU 211 writes the values to the UserName 506, the Password 507, and the RequestID 508 of the authentication service via Bluetooth communication. The CPU 211 writes the authentication information illustrated in Table 5 to the UserName 506 and the Password 507. The CPU 211 writes any one of the values in the Request ID list to the RequestID 508. Next, the CPU 211 receives the Notification notifying the update of the ResultID 509 and the StatusID 505, as a response, from the MFP. Then, the CPU 211 disconnects the Bluetooth connection with the MFP. Then, the CPU 211 stores a local login request state flag in the RAM 203. Subsequently, the processing proceeds to step S608.

In step S608, the CPU 211 determines whether the login request to the MFP has been successfully authenticated.

When the local login request has been performed, the CPU 211 receives the Notification notifying the update of the ResultID 509 and the StatusID 505, as a response, from the MFP. If the ResultID 509 is 1 (i.e., login permission), it means that the authentication processing had been successfully completed. Therefore, the operation of the CPU 211 proceeds to step S611. If the ResultID 509 is 2 (i.e., login rejection), it means that the authentication processing had been failed. Therefore, the operation of the CPU 211 proceeds to step S609. If the ResultID 509 is 3 (i.e., cancellation due to other user's login state), 4 (i.e., other error), or 6 (i.e., cancellation due to own login state), the operation of the CPU 211 proceeds to step S609.

In step S609, the CPU 211 causes the operation unit 214 to display an authentication result indicating that the login processing has been failed.

When the local login request has been performed, the CPU 211 causes the operation unit 214 of the portable terminal to display an appropriate message according to the value of the ResultID 509. For example, if the ResultID 509 is 2, the CPU 211 causes the operation unit 214 to display a message "Login request has been rejected. Please confirm your ID and password setting." If the ResultID 509 is 3, the CPU 211 causes the operation unit 214 to display a message "Login request has been cancelled due to other user's login state." If the ResultID 509 is 4, the CPU 211 causes the operation unit 214 to display a message "Error has occurred." If the ResultID 509 is 6, it means that the login request has been cancelled due to own login state. Therefore, the CPU 211 causes the operation unit 214 to display no message. This is because the portable terminal 102 may transmit the local login request again in the local login state. Therefore, it is desired to prevent an unnecessary message from being displayed on the screen when the user performs an operation. Then, the CPU 211 unsets the local login request state flag and stores the result in the RAM 203. Thus, the operation of the CPU 211 proceeds to step S610.

In step S610, the CPU 211 terminates the sequential processing. Then, the operation of the CPU 211 returns to step S601.

In step S611, the CPU 211 causes the operation unit 214 to display an authentication result indicating that the login processing has been successfully completed.

For example, when the local login request has been performed, the CPU 211 causes the operation unit 214 to display a message "Login to MFP X has been successfully completed." The CPU 211 changes the flag corresponding to the login MFP (i.e., the local login state flag illustrated in Table 6 (i.e., the third condition in step S605)) into "currently in login state." Then, the operation of the CPU 211 proceeds to step S615.

In step S615, the CPU 211 determines whether the user of the portable terminal 102 has logged out.

When the MFP 101 performs the logout processing in above-mentioned step S907, the MFP 101 transmits the Notification notifying the update of the ResultID 509 and the StatusID 505 to the portable terminal 102. If the updated value of the ResultID 509 is 5 (=logout notification), the CPU 211 determines that the user of the portable terminal 102 has logged out of the MFP 101 (YES in step S615). Then, the operation of the CPU 211 proceeds to step S614. Otherwise, the CPU 211 determines that the user of the portable terminal 102 has not logged out of the MFP 101 (NO in step S615). The CPU 211 repeats the processing in step S615.

In step S614, the CPU 211 terminates the sequential processing. When the operation proceeds from step S615 to step S614, the CPU 211 changes the flag corresponding to the login MFP (i.e., the local login state flag illustrated in Table 6 (i.e., the third condition in step S605)) into "logout." Then, the operation of the CPU 211 returns to step S601.

Further, constantly activating the MFP connection application 317 is unnecessary in the scanning processing in step S602. For example, the MFP connection application 317 can request the platform 314 beforehand to monitor an advertizing packet from the predetermined MFP with reference to UUID, Major, and Minor values illustrated in FIG. 9. If the platform 314 receives the advertizing packet from the predetermined MFP, the platform 314 can activate the suspended MFP connection application 317.

<Effects of Present Exemplary Embodiment>

It is now assumed that a user carries the portable terminal 102. A desk ordinarily used by the user is positioned in the Near zone of the MFP 101, which is determined according to the BLE distance calculation. If the setting of the portable terminal 102 is constantly fixed in such a manner that the user operates the portable terminal 102 to log in the MFP 101 when the user is in the "Near" zone, the portable terminal 102 automatically performs a login operation regardless of the user's intent. However, if the user does not operate the portable terminal 102 for a predetermined time, the MFP detects a time-out and causes the user of the portable terminal 102 to log out of the MFP. Subsequently, the portable terminal of the user performs Bluetooth communication with the MFP to perform an operation to log in the MFP again. As the login processing and the logout processing are alternately repeated by the portable terminal 102 as mentioned above, the MFP cannot shift the operational state into the power saving sleep mode. As a result, electric power consumption of the MFP increases.

In the present exemplary embodiment, a user can store automatic login feasibility and distance information for each MFP, as information that can be referred to when the portable terminal 102 logs in the MFP by Bluetooth. For example, the user edits the automatic login setting information 321 and stores the automatic login setting "YES" and the automatic login distance "Immediate." In this case, even when the user sits at a desk that the user uses ordinarily, the portable terminal 102 does not generate any local login request because the distance is in the "Near" zone (not in the "Immediate" zone). In this case, the MFP can promptly shift the operational state into the power saving sleep mode. Subsequently, if the user moves into the "Immediate" zone, the user can perform a local login operation.

Further, it is assumed that the desk ordinarily used by the user is positioned in the Unknown zone of the MFP 103, which is determined according to the BLE distance calculation. If the setting of the portable terminal 102 is constantly fixed in such a manner that the user operates the portable terminal 102 to log in the MFP 103 when the user is in the "Near" zone, the user is required to move into the Near zone when he wants to perform a local login operation. In this case, the user is allowed to edit the automatic login setting information 321 and store the automatic login setting "YES" and the automatic login distance "Far." Thus, the user is only required to move into the "Far" zone to cause the portable terminal 102 to log in the MFP 103.

In a case where the MFP is already in the sleep mode, the MFP can start its operation promptly in response to a local login operation even when the user is in a relatively remote location. It is feasible to decrease the waiting time required to return from the sleep state.

Further, if the user has no intent to use the MFP 106 belonging to another division of the same office (or company), the user can set the automatic login setting to "NO" to prevent the portable terminal from starting a login operation unintentionally. As a result, the operation for shifting the MFP 106 belonging to another division into the power saving sleep mode is not disturbed.

Accordingly, the present invention can provide a login mechanism that only requires a user having a portable terminal to approach an intended MFP to log in the MFP.

Other Exemplary Embodiment

The present invention can be realized by the following processing. The processing includes supplying a program capable of realizing at least one function described in the above-mentioned exemplary embodiments to a system or an apparatus via a network or a storage medium. The processing further includes causing at least one processor of a computer provided in the system or the apparatus to read and execute the program. Further, the present invention can be realized by a circuit (e.g., ASIC) capable of realizing at least one of the above-mentioned functions.

As mentioned above, the present invention can provide a login mechanism that requires a user carrying an information processing apparatus only to approach an intended device to log in the device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050969, filed Mar. 13, 2015, which is hereby incorporated by reference herein in its entirety.

What is claimed is:

1. A mobile terminal that transmits a login request to a device based on satisfaction of a condition comprising:
    at least one memory device that stores a set of instructions; and
    at least one processor that executes the instructions, the instructions, when executed, causing the mobile terminal to perform operations comprising:
        individually setting login distances for a plurality of devices as a condition to be satisfied in order for the mobile terminal to transmit the login request-to at least one of the plurality of devices meeting the condition and which causes transition of an operation screen displayed on a display of the at least one of the plurality of devices meeting the condition to enable at least one function of the one of the plurality of devices meeting the condition to be used via the display;
        referring to a packet received by the mobile terminal from at least one of the plurality of devices and
        determining whether a login distance, having been set for a respective one of the plurality of devices from which the packet has been received, is satisfied; and
        transmitting the login request to the at least one of the plurality of devices from which the packet has been received if it is determined that the login distance condition is satisfied.

2. The mobile terminal according to claim 1, wherein, execution of the instructions causes the mobile terminal to perform operations further comprising:
    identifying a distance between the respective one of the plurality of devices and the mobile terminal based on the packet received by the mobile terminal, and
    determining whether the distance identified satisfies the login distance condition.

3. The mobile terminal according to claim 2, wherein the mobile terminal identifies the distance between the respective one of the plurality of devices and the mobile terminal based on field intensity information of the packet.

4. The mobile terminal according to claim 1, wherein, execution of the instructions causes the mobile terminal to perform operations further comprising:
displaying a setting screen that enables a user to individually designate the login distance for each of the plurality of devices,
wherein the login distance is set based on a user designation input via the setting screen.

5. The mobile terminal according to claim 4, wherein the setting screen is able to display a peripheral device positioned around the mobile terminal that has transmitted the packet.

6. The mobile terminal according to claim 1, wherein the user information is transmitted to the at least one of the plurality of devices as the login request.

7. The mobile terminal according to claim 6, wherein the user information, having been set beforehand for the mobile terminal, is transmitted to the at least one of the plurality of devices.

8. The mobile terminal according to claim 1, wherein the packet is a Bluetooth advertizing packet.

9. A control method for a mobile terminal that transmits a login request to a device based on satisfaction of a condition comprising:
individually setting login distances for a plurality of devices as a condition to be satisfied in order for the mobile terminal to transmit the login request to at least one of the plurality of devices meeting the condition and which causes transition of an operation screen displayed on a display of the at least one of the plurality of devices meeting the condition to enable at least one function of the one of the plurality of devices meeting the condition to be used via the display;
referring to a packet received by the mobile terminal from at least one of the plurality of devices and determining whether a login distance, having been set for the respective one of the plurality of devices from which the packet has been received, is satisfied; and
transmitting the login request to the at least one of the plurality of devices from which the packet has been received if it has been determined that the login distance condition is satisfied.

10. The control method for the mobile terminal according to claim 9, further comprising:
identifying a distance between the respective one of the plurality of devices and the mobile terminal based on the packet received by the mobile terminal,
wherein the determining includes determining whether that the identified distance satisfies the login distance condition.

11. The control method for the mobile terminal according to claim 10, wherein the identifying includes identifying the distance between the respective one of the plurality of devices and the mobile terminal based on field intensity information of the packet.

12. The control method for the mobile terminal according to claim 9, further comprising:
displaying a setting screen that enables a user to individually designate the login distance for each of the plurality of devices,
wherein the login distance is set based on a user designation input via the setting screen.

13. The control method for the mobile terminal according to claim 12, wherein the setting screen is able to display a peripheral device positioned around the mobile terminal that has transmitted the packet.

14. The control method for the mobile terminal according to claim 9, wherein the transmitting includes transmitting user information, as the login request, to the at least one of the plurality of devices.

15. The control method for the mobile terminal according to claim 14, wherein
the transmitting includes transmitting the user information having been set beforehand for the mobile terminal to the at least one of the plurality of devices.

16. The control method for the mobile terminal according to claim 9, wherein the packet is a Bluetooth advertizing packet.

17. A non-transitory computer-readable storage medium storing instructions that, when executed by a computer, execute a control method to control a mobile terminal that transmits a login request to a device based on satisfaction of a condition the control method comprising:
individually setting login distances for a plurality of devices as a condition to be satisfied in order for the mobile terminal to transmit the login request to at least one of the plurality of devices meeting the condition and which causes a transition of an operation screen displayed on a display of the at least one of the plurality of devices meting the condition to enable at least one function of the one of the plurality of devices meeting the condition to be used via the display;
referring to a packet received by the mobile terminal from at least one of the plurality of devices to the mobile terminal and determining whether a login distance having been set for the respective one of the plurality of devices from which the packet has been received is satisfied; and
transmitting the login request to the at least one of the plurality of devices from which the packet has been received if it is determined that the login distance condition is satisfied.

18. The non-transitory computer-readable storage medium according to claim 17, wherein the respective one of the plurality of devices is an image processing apparatus; and wherein, at least upon successful user authentication based on the login request, a screen that includes a display item for selecting at least a copy function of the image processing apparatus is displayed on the operation unit of the image processing apparatus.

19. The non-transitory computer-readable storage medium according to claim 17, wherein the control method executed further comprises:
displaying a setting screen that enables a user to individually designate the login distance for each of the plurality of devices,
wherein the login distance is set based on a user designation input via the setting screen.

20. The non-transitory computer-readable storage medium according to claim 17, wherein the packet is a Bluetooth advertizing packet.

* * * * *